United States Patent
Wu

(10) Patent No.: US 10,547,262 B2
(45) Date of Patent: Jan. 28, 2020

(54) ESTIMATING ROTOR SPEED AND ROTOR ANGLE

(71) Applicant: Infineon Technologies Austria AG, Villach (AT)

(72) Inventor: Wei Wu, Rancho Palos Verdes, CA (US)

(73) Assignee: Infineon Technologies Austria AG, Villach (AT)

( * ) Notice: Subject to any disclaimer, the term of this patent is extended or adjusted under 35 U.S.C. 154(b) by 464 days.

(21) Appl. No.: 15/399,558

(22) Filed: Jan. 5, 2017

(65) Prior Publication Data

US 2018/0191284 A1 Jul. 5, 2018

(51) Int. Cl.
| H02P 21/22 | (2016.01) |
| H02P 6/06 | (2006.01) |
| H02P 1/04 | (2006.01) |
| H02P 21/18 | (2016.01) |
| H02P 21/14 | (2016.01) |
| H02P 27/08 | (2006.01) |
| H02P 6/17 | (2016.01) |

(52) U.S. Cl.
CPC .............. *H02P 21/18* (2016.02); *H02P 6/17* (2016.02); *H02P 21/141* (2013.01); *H02P 27/08* (2013.01)

(58) Field of Classification Search
CPC .............................. H02P 21/141; H02P 21/18
See application file for complete search history.

(56) References Cited

U.S. PATENT DOCUMENTS

| 6,910,389 | B2 | 6/2005 | Ho |
| 6,979,967 | B2 | 12/2005 | Ho |
| 7,066,034 | B2 | 6/2006 | Ho |
| 7,342,379 | B2 | 3/2008 | Marcinkiewicz et al. |
| 7,583,049 | B2 | 9/2009 | Marcinkiewicz et al. |
| 2011/0062909 | A1* | 3/2011 | Patel ........................ H02P 6/18 318/400.32 |
| 2016/0315572 | A1* | 10/2016 | Magee .................... H02P 21/24 |

OTHER PUBLICATIONS

"Sensorless Field Oriented Control for PMSM Motors," Infineon, AP08059, V1.0, May 2007, 29 pp.
Cheles, Sensorless Field Oriented Control (FOC) of an AC Induction Motor (ACIM), Microchip, AN1162, Jan. 2008, 34 pp.
"Field Orientated Control of 3-Phase AC-Motors," Texas Instruments Incorporated, Feb. 1998, 24 pp.
"IRMCK099 Application Guide," Infineon, Rev 1.0, Sep. 8, 2016, 76 pp.
"Speed PI Regulator," Allen-Bradley, 1336 Impact AC Drive, Jun. 2000, 8 pp.
U.S. Appl. No. 15/379,185, filed Dec. 14, 2016, filed by Wei Wu.

* cited by examiner

*Primary Examiner* — Bickey Dhakal
*Assistant Examiner* — Charles S Laughlin
(74) *Attorney, Agent, or Firm* — Shumaker & Sieffert, P.A.

(57) ABSTRACT

In some examples, a controller device includes processing circuitry configured to determine an alpha voltage and a beta voltage based on time durations for control signals for power-conversion circuitry that drives an electric motor including a rotor. In some examples, the controller device also includes a flux estimator configured to estimate a speed of the rotor and an angle of the rotor based on the alpha voltage and the beta voltage.

20 Claims, 9 Drawing Sheets

… (1) …

ESTIMATING ROTOR SPEED AND ROTOR ANGLE

TECHNICAL FIELD

This disclosure relates to the control of electric motors.

BACKGROUND

An electric motor converts electricity into mechanical power in the form of a rotating shaft known as a rotor. The electrical currents flowing through field windings in a stator of the electric motor may cause the rotor to rotate at a certain speed or angular velocity. A controller device may implement a method known as field-oriented control (FOC) or vector control to determine the amplitude of the electrical currents that should flow through each field winding of the stator. A controller device using FOC may measure the electrical currents through the field windings and determine pulse-width modulated (PWM) control signals for power-conversion circuitry that drives the electric motor. The controller device may determine the time durations for each of the switches in the power-conversion circuitry based on the desired voltages to be applied to each field winding.

SUMMARY

This disclosure describes techniques for estimating the rotor speed and rotor angle for an electric motor including field windings and a rotor. A controller device may include a flux estimator that is configured to determine an estimated rotor speed and an estimated rotor angle. Processing circuitry of the controller device may determine the actual voltages to be applied to the field windings based on the time durations for the switches in the power-conversion circuitry. In a two-dimensional coordinate system, these voltages may be known as the unmodulated or reconstructed alpha and beta voltages. The flux estimator may estimate the rotor speed and the rotor angle based on the reconstructed alpha and beta voltages, and further based on the electrical current(s) through the electric motor. The reconstructed alpha and beta voltages may be more accurate indications of the actual voltages to be applied to the field windings, as compared to the voltage commands on the alpha-beta axes, as determined by the current regulator of the controller device. Thus, the flux estimator may determine more accurate estimates of the rotor speed and the rotor angle.

In some examples, a controller device includes processing circuitry configured to determine an alpha voltage and a beta voltage based on time durations for control signals for power-conversion circuitry that drives an electric motor including a rotor. In some examples, the controller device also includes a flux estimator configured to estimate a speed of the rotor and an angle of the rotor based on the alpha voltage and the beta voltage.

In some examples, a method includes determining an alpha voltage and a beta voltage based on time durations of control signals for power-conversion circuitry that drives an electric motor including a rotor. The method also includes estimating a speed of the rotor and an angle of the rotor based on the alpha voltage and the beta voltage.

In some examples, a system includes an electric motor including a rotor and field windings, power-conversion circuitry configured to drive the electric motor, and a controller device configured to generate control signals for the power-conversion circuit. The controller device includes processing circuitry configured to determine an alpha voltage and a beta voltage based on time durations for the control signals. The controller device also includes a flux estimator configured to estimating a speed of the rotor and an angle of the rotor based on the alpha voltage and the beta voltage.

The details of one or more examples are set forth in the accompanying drawings and the description below. Other features, objects, and advantages will be apparent from the description and drawings, and from the claims.

DETAILED DESCRIPTION

Figure 1:
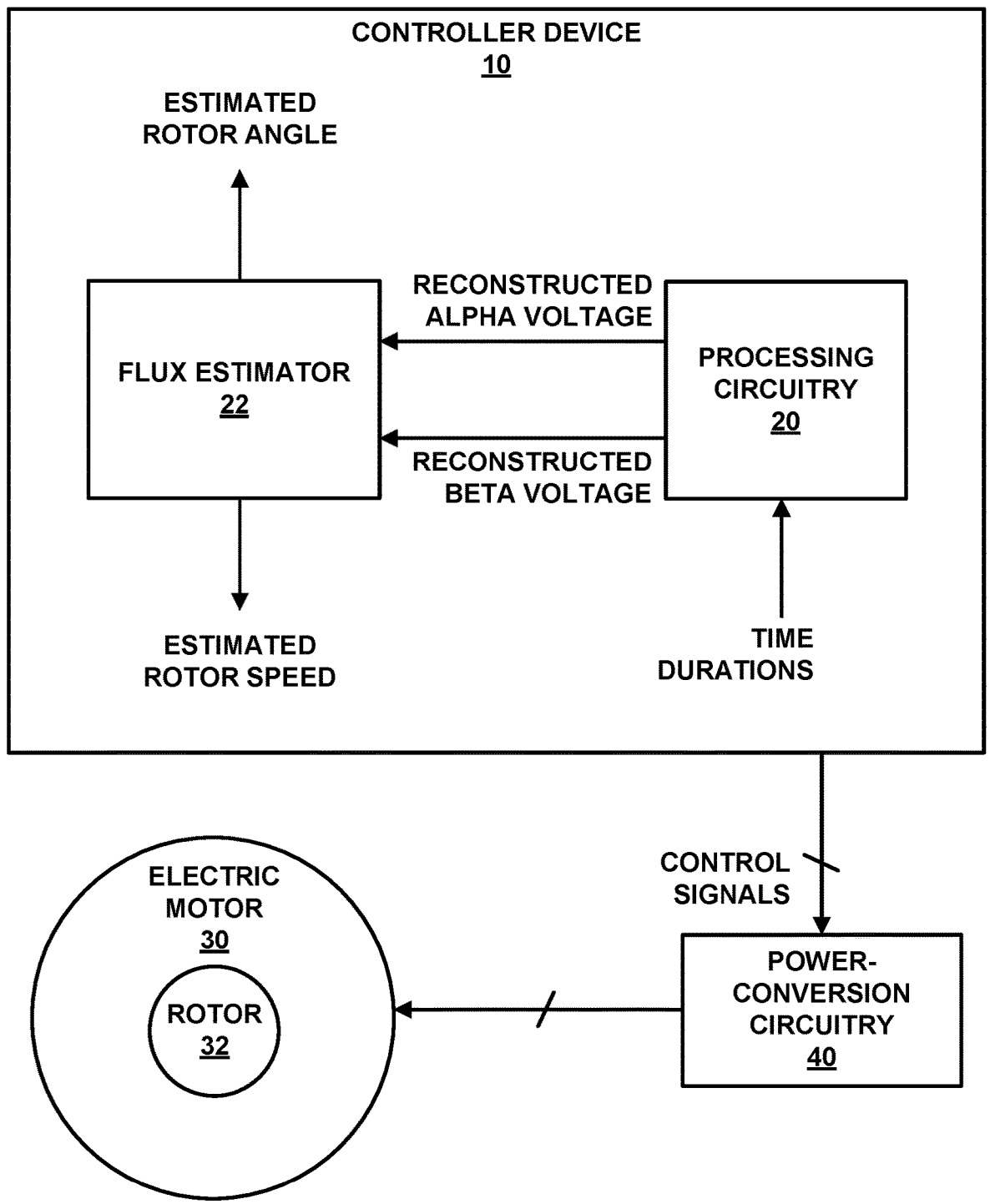
FIG. 1 is a conceptual block diagram of a controller device configured to estimate a rotor speed and a rotor angle based on an alpha voltage and an beta voltage, in accordance with some examples of this disclosure.

This disclosure describes circuits and techniques for estimating a rotor speed and a rotor angle of an electric motor based on an alpha voltage and a beta voltage. A flux estimator of a controller device may estimate the rotor speed and the rotor angle based on an alpha voltage and a beta voltage, where these voltages are "modulated" voltages or "reconstructed" voltages. The modulated or reconstructed alpha voltage and beta voltage may be more accurate indications of the actual voltages across the field windings, as compared to an unmodulated alpha voltage and an unmodulated beta voltage determined by a current regulator module of the controller device. For example, the unmodulated alpha voltage and the unmodulated beta voltage may not account for the voltage on a direct-current (DC) bus of the controller device. Moreover, the unmodulated alpha voltage and the unmodulated beta voltage may not account for a time duration threshold for the control signals for power-conversion circuitry to drive an electric motor.

Using the modulated or reconstructed voltages, the flux estimator may determine more accurate estimates of rotor speed and rotor angle. The frequency of the pulse-width modulated (PWM) control signals may be reduced because of the more accurate estimates of rotor speed and rotor angle. In some examples, the techniques of this disclosure may allow for a reduction of PWM frequency from twenty-two thousand kilohertz to fifteen thousand kilohertz for a rotor speed of twenty-five thousand revolutions per minute (RPM). A lower PWM frequency results in lower switching losses for the power-conversion circuitry. In addition, for a given PWM frequency, the rotor speed may be increased while maintaining adequate control, as compared to another controller device estimating rotor speed and rotor angle based on unmodulated voltages. Moreover, a controller device may have limited central processing unit (CPU) power that constrains the maximum PWM frequency that the controller device can generate. As a result, the PWM frequency may be constrained for a given controller device, so a designer may choose a controller device with a lower maximum PWM frequency for a desired motor speed.

The techniques of this disclosure may improve the accuracy of estimations when an electric motor is operating at a high rotor speed because modulation may increase with rotor speed. At high rotor speeds, unmodulated time durations may exceed a duty-cycle threshold imposed by the controller device. Therefore, reconstructing the alpha and beta voltages based on the modulated time durations may provide greater benefits as the rotor speed increases. Some applications, such as washing machines, operate in field-weakening mode with a high modulation index. Reconstructing the alpha and beta voltages based on the modulated time durations may provide better control for electric motors operating in field-weakening mode with a high modulation index.

As used herein, the term "estimate" generally means to determine an estimation. A controller device of this disclosure may, for example, determine an estimation by correlating known input data to an estimation using a set of rules, relationships, and/or algorithms. For example, as will be explained in more detail below, to estimate a rotor speed and/or a rotor angle, a system of this disclosure may determine certain information, such as the electrical current(s) through one or more field windings of electric motor, and/or the voltage applied to the field windings. In some instances, the known input data for determining one estimation may include another estimation. As explained in more detail herein, an alpha voltage and a beta voltage may be used to determine an estimated rotor speed and an estimated rotor angle.

FIG. 1 is a conceptual block diagram of a controller device configured to estimate a rotor speed and a rotor angle based on an alpha voltage and an beta voltage, in accordance with some examples of this disclosure. Controller device 10 may be configured to generate control signals to cause power-conversion circuitry 40 to drive rotor 32 of electric motor 30. In some examples, controller device 10 may implement field-oriented control (FOC), which may be known as vector control, to determine the control signals to transmit to power-conversion circuitry 40. In some examples, controller device 10 may operate without a sensor configured to sense the position and/or angular velocity of rotor 32. However, the techniques of this disclosure may be useful even if controller device 10 includes a sensor configured to sense the position and/or angular velocity of rotor 32.

Controller device 10 is configured to determine the time durations for the control signals delivered to power-conversion circuitry 40. Controller device 10 may receive and/or determine the electrical currents flowing through the field windings of electric motor 30. Controller device 10 may also receive and/or determine the voltages applied to the field windings. Controller device 10 may include flux estimator 22 configured to determine an estimated rotor angle and an estimated rotor speed for rotor 32 based on the electrical currents and the applied voltages.

Processing circuitry 20 is configured to determine an alpha voltage and a beta voltage based on time durations for the control signals for power-conversion circuitry 40. The alpha voltage and the beta voltage may be referred to as a "reconstructed alpha voltage" and a "reconstructed beta voltage" because processing circuitry 20 may determine, or reconstruct, the alpha voltage and the beta voltage based on modulated time durations. The modulated time durations may be different than the unmodulated time durations based on the voltage on a DC bus of controller device 10. The modulated time durations may also be different than the unmodulated time durations based on a threshold time duration, as explained in more detail herein.

Flux estimator 22 is configured to determine an estimated rotor angle and an estimated rotor speed based on the reconstructed alpha voltage and the reconstructed beta voltage. Flux estimator 22 may receive the reconstructed alpha voltage and the reconstructed beta voltage from processing circuitry 20. Flux estimator 22 may include software and/or hardware components configured to create a rotating reference frame to align with an axis of rotor 32. The axis of rotor 32 may include a direct axis and/or a torque axis, which may be non-stationary, or rotating, axes. Flux estimator 22 may first determine an alpha flux and a beta flux based on an alpha voltage, a beta voltage, an alpha current, and a beta current. Flux estimator 22 may then determine an estimated rotor angle based on the alpha flux and the beta flux and determine an estimated rotor speed based on the rate of change for the estimated rotor angle. Flux estimator 22 may determine an estimated rotor angle and an estimated rotor speed at a rate of once per PWM cycle.

In some examples, flux estimator 22 may include a phase-locked loop (PLL) configured to determine the estimated rotor angle based on the alpha flux and the beta flux. The PLL may include software instructions to be executed by circuitry of controller device 10. In some examples, flux estimator 22 may include instructions that cause the circuitry of controller device 10 to determine the estimated rotor angle based on algorithm using the alpha flux and the beta flux as input variables.

In accordance with the techniques of this disclosure, flux estimator 22 may determine more accurate estimates of rotor speed and rotor angle, as compared to another flux estimator that determines speed and angle estimates based on unmodulated alpha and beta voltages. The more accurate estimates may improve the control of rotor 32 by controller device 10, allowing a reduction in the PWM frequency of the control signals relative to the rotor speed. Thus, controller device 10 may reduce switching losses by reducing the PWM frequency, and/or controller device 10 may increase the rotor speed for a given PWM frequency.

Controller device 10, including processing circuitry 20 and flux estimator 22, may process variables such as electrical currents, applied voltages, and/or time durations in multiple reference frames. The multiple reference frames may include a three-axes coordinate system (e.g., u, v, and w), where each axis of the three axes corresponds to a field winding in a three-phase electric motor. For electric motors with more or fewer phases than three phases, controller device may employ a number of axes that corresponds to a number of phases or a number of field windings. Controller device 10 may also process variables in an alpha-beta coordinate system (e.g., α and β) for convenience of calculations by controller device 10. The alpha axis and the beta axis may be Cartesian coordinates that are stationary with respect to the stator of electric motor 30. Thus, as rotor 32 rotates, the alpha-beta axes may not change. Controller device 10 may process variables in a direct-torque coordinate system (e.g., d and q), where the torque axis and the direct axis are Cartesian coordinates that are non-stationary with respect to the stator. Controller device 10 may continually re-align the direct axis and the torque axis with an estimated angle of rotor 32 that is determined by flux estimator 22.

Figure 2A:
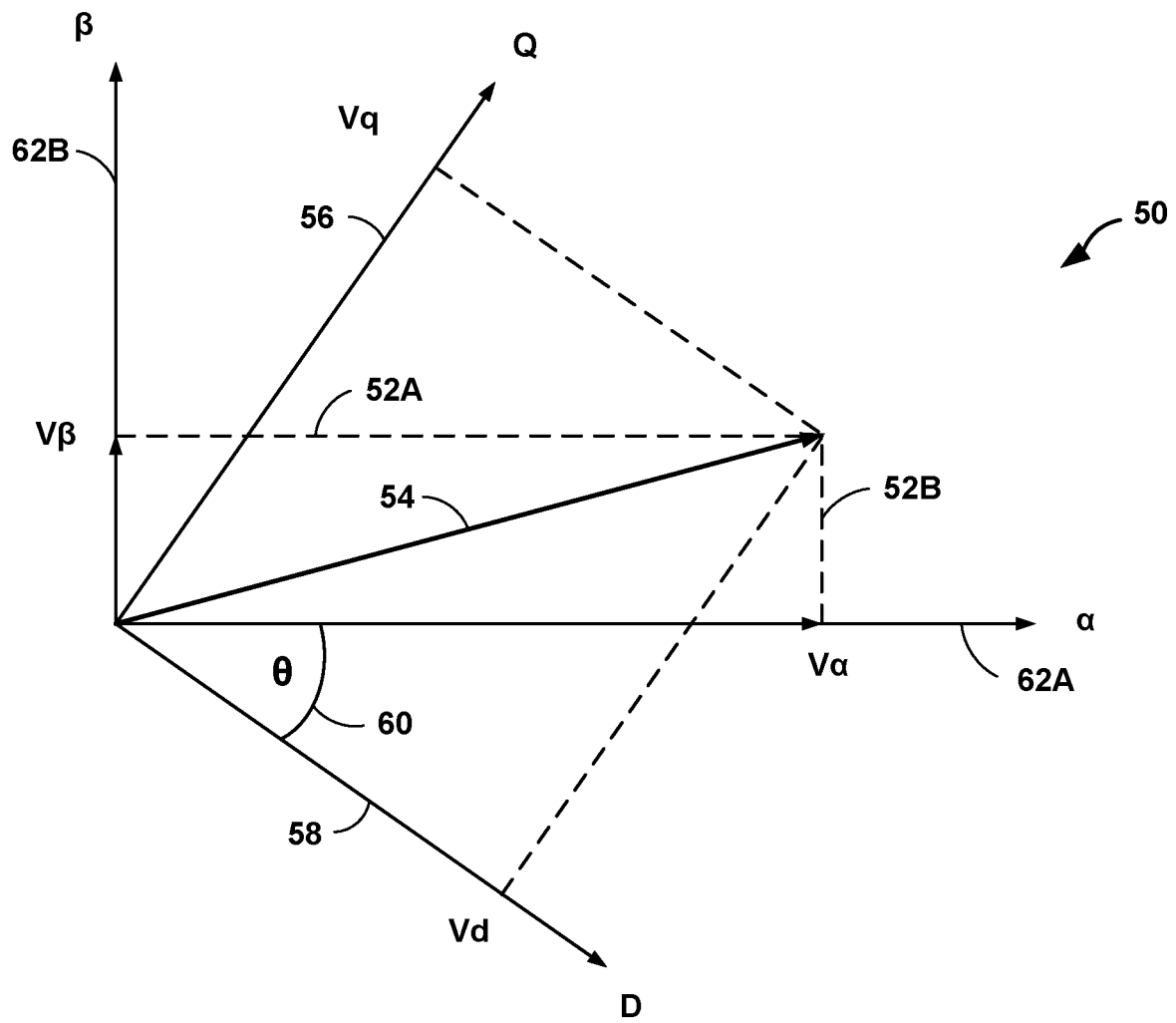
FIG. 2A shows a graph of an alpha voltage and a beta voltage including an alpha-beta coordinate system and a direct-torque coordinate system, in accordance with some examples of this disclosure.

FIG. 2A shows a graph 50 of an alpha voltage 52A and a beta voltage 52B including an alpha-beta coordinate system and a direct-torque coordinate system, in accordance with some examples of this disclosure. A current regulator of controller device 10 may first determine vector 54, defined relative to torque axis 56 and direct axis 58, to drive rotor 32 to rotate at a desired speed. Vector 54 may be a combined voltage vector including a component along torque axis 56 (Vq) and a component along the direct axis 58 (Vd). Vector 54 may include a component along alpha axis 62A (alpha voltage 52A) and a component along the beta axis 62B (beta voltage 52B). Alpha voltage 52A may be defined relative to, or by, alpha axis 62A, and beta voltage 52B may be defined relative to, or by, beta axis 62B. Torque axis 56 may be offset by ninety degrees from direct axis 58, which may be offset from alpha axis 62A by estimated rotor angle 60. Estimated rotor angle 60 may change over time, causing torque axis 56 and direct axis 58 to change orientation with respect to alpha axis 62A and beta axis 62B. To cause rotor 32 to speed up, the current regulator may determine vector 54 such that the torque-axis component of vector 54 has a large positive magnitude.

The current regulator may convert vector 54 to alpha voltage 52A and beta voltage 52B. The current regulator may determine alpha voltage 52A and beta voltage 52B based on vector 54, the direct voltage, and estimated rotor angle 60 (represented by θ). The conversion from a torque-direct coordinate system to an alpha-beta coordinate system is called a reverse-Park transform. If the direct voltage is equal to zero alpha axis 62A and beta axis 62B may be related to torque voltage 54 by the following equations:

$$V\alpha = Vq \times \cos(\theta + 90°)$$

$$V\beta = Vq \times \sin(\theta + 90°)$$

Figure 2B:
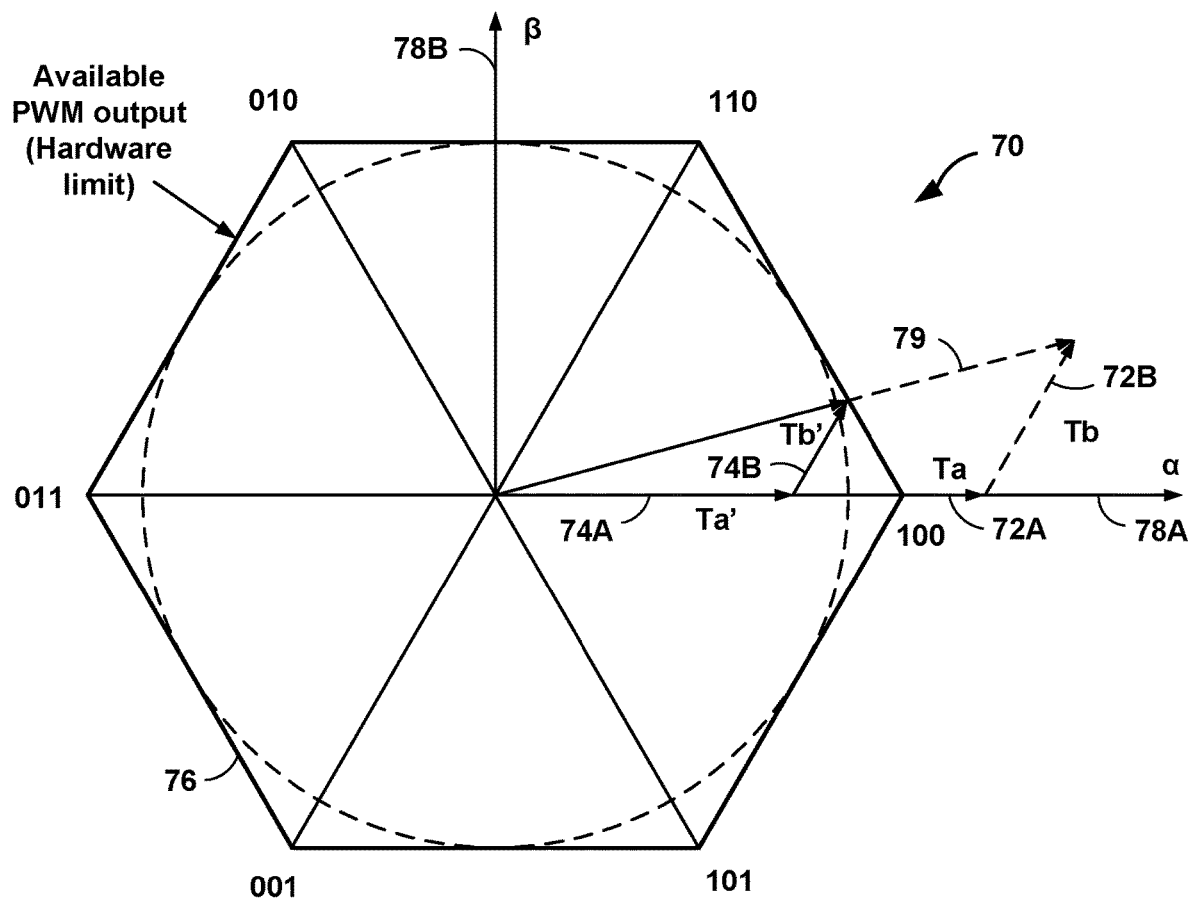
FIG. 2B shows a graph of two unmodulated time durations and two modulated time durations, in accordance with some examples of this disclosure.

FIG. 2B shows a graph 70 of two unmodulated time durations 72A and 72B and two modulated time durations 74A and 74B, in accordance with some examples of this disclosure. The time durations of graph 70 may be plotted on two axes 78A and 78B that correspond to alpha axis 62A and beta axis 62B of graph 50. Processing circuitry 20 may determine unmodulated time duration 72A, which is depicted as (Ta) on graph 70, and unmodulated time duration 72B (Tb) on graph 70, based on alpha voltage 52A and beta voltage 52B shown in FIG. 2A. Unmodulated time duration 72A may be offset from unmodulated time duration 72B by sixty degrees in the example of a three-phase electric motor. Unmodulated time durations 72A and 72B may represent the amount of time that the switches of power-conversion circuitry 40 are active such that alpha voltage 52A and beta voltage 52B may be applied to the field windings of electric motor 30.

Processing circuitry 20 may determine modulated time duration 74A (Ta') and modulated time duration 74B (Tb') on graph 70, based on unmodulated time durations 72A and 72B and threshold 76. Threshold 76 may represent the maximum available PWM output time duration for the switches of power-conversion circuitry 40 to be active. Threshold 76 may be a hardware limit for controller device 10. For each phase, only a high-side switch or a low-side switch may be active at any moment in time. The active switch of each pair of switches is indicated by a digit of the three-digit binary number for each vector. For example, modulated time duration 72A may have the same direction as vector 100, which represents an active first high-side switch, an active second low-side switch, and an active third low-side switch. Modulated time duration 72B may have the same direction as vector 110, which represents an active first high-side switch, an active second high-side switch, and an active third low-side switch. FIG. 2B shows six distinct vectors (100, 101, 001, 011, 010, and 110) but does not depict vector 111 or 000. In addition, there may be dead time between the active period of a high-side switch and the active period of a respective low-side switch.

Processing circuitry 20 may scale unmodulated time durations 72A and 72B to determine modulated time durations 74A and 74B. Thus, in some examples, the ratio of unmodulated time duration 72A to unmodulated time duration 72B may be equal to the ratio of modulated time duration 74A to modulated time duration 74B. To scale the time durations, processing circuitry 20 may be configured to determine a magnitude of vector 79 and determine whether the magnitude of vector 79 exceeds threshold 76. If the magnitude of vector 79 exceeds threshold 76, processing circuitry 20 may be configured to determine modulated time durations 74A and 74B by multiplying unmodulated time durations 72A and 72B by a factor. The factor may be a numerical value that is less than or equal to the magnitude of threshold 76 divided by the magnitude of vector 79.

In some examples, threshold 76 may be equal to a PWM duty cycle of one hundred percent, before adding dead time. If the magnitude of vector 79 is equivalent to a duty cycle of two hundred percent, processing circuitry 20 may determine that the scaling factor is equal to fifty percent, which is equal to one hundred divided by two hundred. Processing circuitry 20 may determine modulated time duration 74A by multiplying unmodulated time duration 72A by fifty percent. Processing circuitry 20 may determine modulated time duration 74B by multiplying unmodulated time duration 72B by fifty percent.

Vector 79 may be a combined time-duration vector that represents the voltage to be applied to the field windings of electric motor 30. Controller device 10 may determine vector 79 to minimize the component of vector 79 along a direct axis and/or to maximize the component of vector 79 along a torque axis. Thus, vector 79 may include a component along the a-axis (unmodulated time duration 72A) and a component along the b-axis (unmodulated time duration 72B).

Figure 2C:
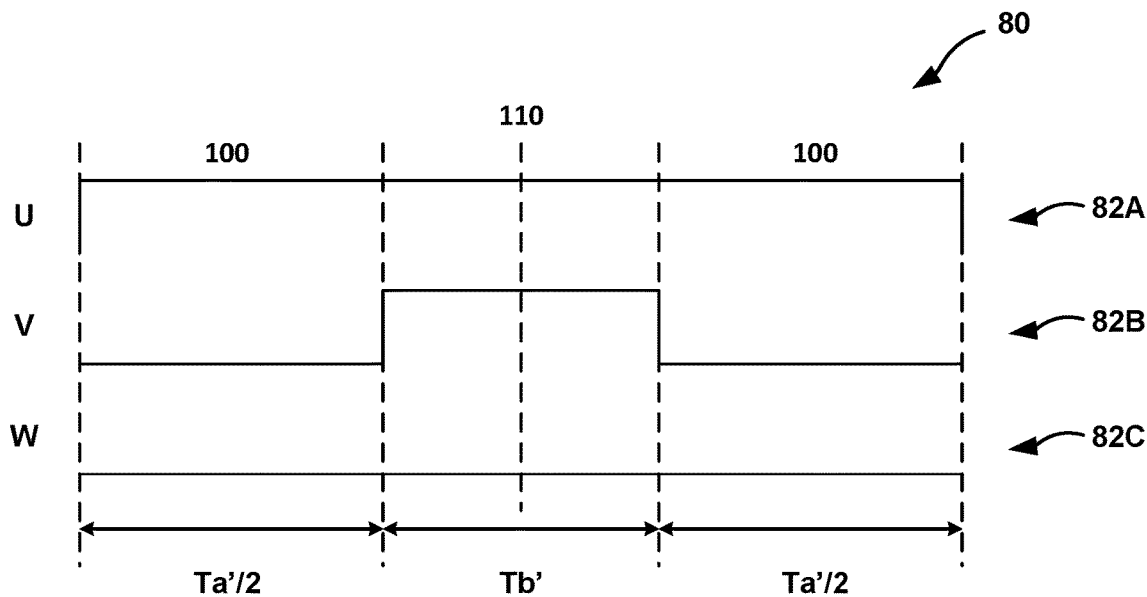
FIG. 2C shows a graph of the PWM control signals for three phases of power-conversion circuitry, in accordance with some examples of this disclosure.

FIG. 2C shows a graph 80 of the PWM control signals 82A-82C for three phases of power-conversion circuitry 40, in accordance with some examples of this disclosure. Control signal 82A for the first phase (U) includes a duty cycle of one-hundred percent for the high-side switch and a duty cycle of zero for the low-side switch. Control signal 82B for the second phase (V) includes a duty cycle equal to modulated time duration 74B for the high-side switch and a duty cycle of one-hundred percent minus modulated time duration 74B for the low-side switch. Control signal 82A for the third phase (W) includes a duty cycle of zero for the high-side switch and a duty cycle of one-hundred percent for the low-side switch.

Figure 3:
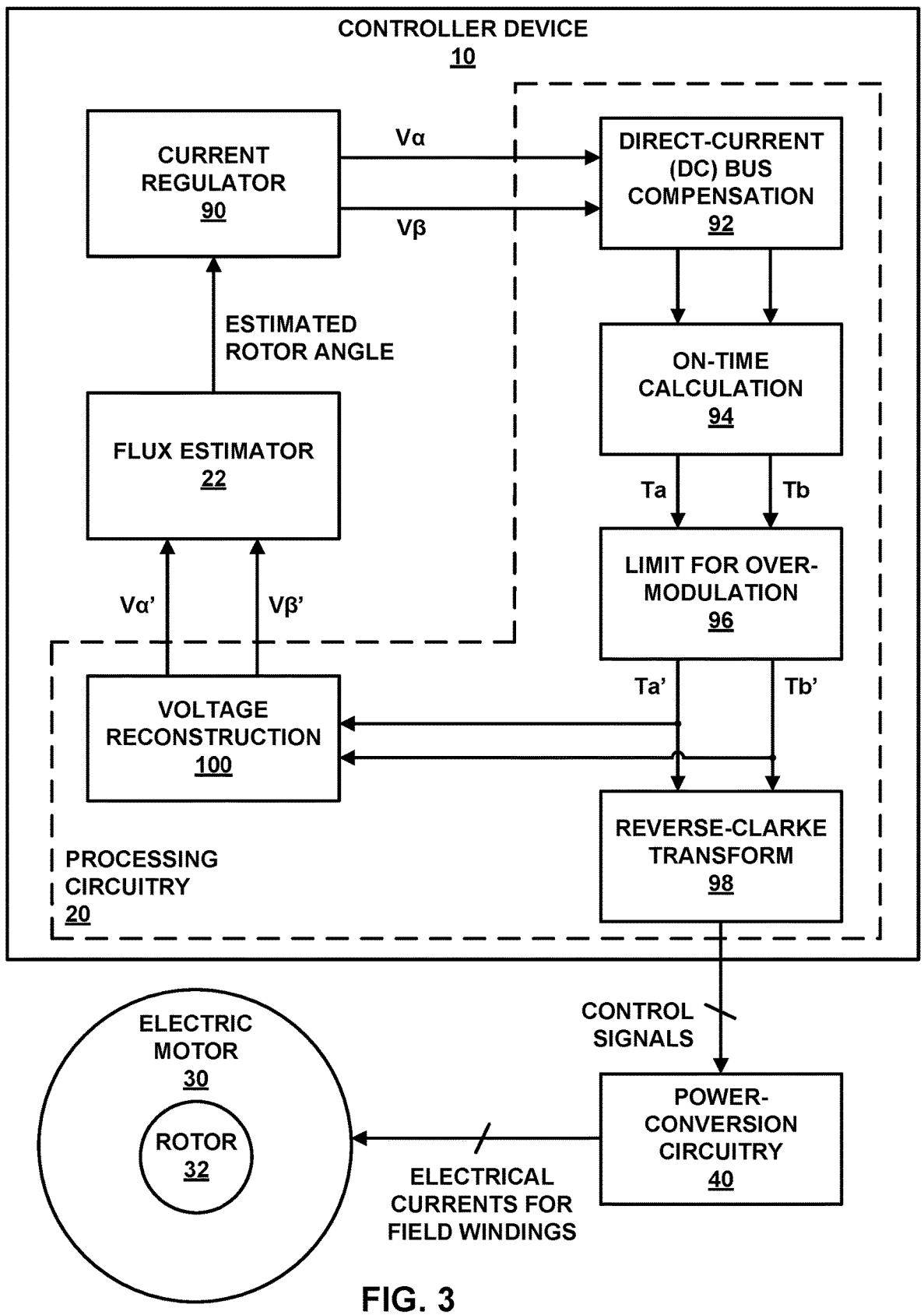
FIG. 3 is a conceptual block diagram including additional examples and details for the processing circuitry of the controller device of FIG. 1, in accordance with some examples of this disclosure.

FIG. 3 is a conceptual block diagram including additional examples and details for processing circuitry 20 of controller device 10 of FIG. 1, in accordance with some examples of this disclosure. Controller device 10 and/or processing circuitry 20 may include one or more software modules, such as current regulator 90, DC bus compensation 92, on-time calculation 94, limit for over-modulation 96, reverse Clarke transform 98, and voltage reconstruction 100. Voltage reconstruction 100 may determine the reconstructed alpha and beta voltages (Vα' and Vβ') based on the modulated time durations (Ta' and Tb')

Current regulator 90 may be configured to determine an unmodulated alpha voltage (Vα) and an unmodulated beta voltage (Vβ) based on an estimated rotor angle determined by flux estimator 22. Current regulator 90 may be configured to determine the unmodulated alpha voltage and the unmodulated beta voltage based on the voltages to apply to the field windings of electric motor 30 to cause rotor 32 to reach a target speed. Current regulator 90 may be configured to determine the unmodulated alpha and beta voltages to maximize the torque-axis voltage and minimize the direct-axis voltage. The unmodulated alpha voltage and the unmodulated beta voltage may represent voltage commands to processing circuitry 20.

DC bus compensation 92 may be configured to adjust the unmodulated alpha voltage and the unmodulated beta voltage based on the voltage on a DC bus of controller device 10. In some examples, DC bus compensation 92 may increase the unmodulated voltages for a relatively low voltage on the DC bus.

On-time calculation 94 may be configured to determine the time durations for the switches in power-conversion circuitry 40 in a two-dimensional coordinate system. The time durations may represent the on-times or duty cycles of the switches. Limit for over-modulation 96 may be configured to scale down the time durations if the time durations exceed a threshold. The threshold may represent a maximum duty cycle for the switches in power-conversion circuitry 40. Reverse-Clarke transform 98 may be configured to convert the modulated time durations received from limit for over-modulation 96 from a two-dimensional coordinate system to a three-dimensional coordinate system, if electric motor 30 has three phases.

Voltage reconstruction 100 may be configured to determine a reconstructed alpha voltage and a reconstructed beta voltage based on the modulated time durations received from limit for over-modulation 96. Voltage reconstruction 100 may apply an algorithm or set of rules to the modulated time durations to determine the reconstructed voltages. The algorithm or set of rules may be a reversed version of the algorithm applied by on-time calculation 94 to determine the unmodulated time durations from the unmodulated voltages. The algorithm(s) implemented by processing circuitry 20 may include a convert table for on-time calculation 94 and another convert table for voltage reconstruction 100. The convert table for voltage reconstruction 100 may also include a reversed version of DC bus compensation 92. In some examples, voltage reconstruction 100 may include software instructions similar to the following pseudocode. The following software pseudocode may also include instructions used in other modules of processing circuitry 20.

| Pseudocode. |
|---|
| ```
// This code is function inside firmware space vector module
// The inputs of space vector module are V_Alpha and V_Beta,
// before come to this point, the inputs already been processed:
// 1. DC bus compensation - we need this compensation because the lower the DC bus,
// the higher the PWM duty cycle to achieve same V_Alpha/V_Beta
// 2. Ta & Tb calculation - conversion from V_Alpha/V_Beta to Ta/Tb
// 3. Ta & Tb limit in case of over-modulation (which causes change to Ta & Tb)
// The purpose of this code is to reconstruct the V_Alpha_Aply and V_Beta_Aply.
// It uses rvct table with another input "sector" to perform the conversion
// from Ta/Tb to V_Alpha/V_Beta, the result of conversion is then multiplied with
// DC bus voltage to revert the effect of DC bus compensation.
va_vb_reconstruction:// calculate actual V_Alpha and V_Beta, use it in flux estimator
        load    V_Alpha_Aply;
        store   V_Alpha_Aply_prev;
        load    V_Beta_Aply;
        store   V_Beta_Aply_prev;
        load    sector;
        addi    rvct0;
        plda;                      // load ta/tb -> x/y convert table according to sector
        store   temp1;             // temp1 = convert table entry
        shftr   12;
        sext    3;
        muls    ta;
        store   temp2;
        load    temp1;
        shftr   8;
        sext    3;
        muls    tb;
        adds    temp2;
        muls    DcBusVoltsRaw;
        shftrx  13;
        store   V_Alpha_Aply;      //value calculated in this cycle and
        load    temp1;             // represents V_Alpha for next cycle
        shftr   4;
        sext    3;
        muls    ta;
``` |

-continued

Pseudocode.

```
    store   temp2;
    load    temp1;
    sext    3;
    muls    tb;
    addm    temp2;
    loadi   0x6d;
    loadih  0x37;           // 0x376d = 0.866 in Q14
    muls    temp2;
    shftrx  14;
    muls    DcBusVoltsRaw;
    shftrx  12;
    store   V_Beta_Aply;    // value calculated in this cycle and
                            // represents V_Alpha for next cycle
// ta/tb to x_in/y_in convert table, this table is used to convert ta/tb back into x/y
// for example: sector 0 -> rvct0=0x2101, x=ta*2*0.5+tb*1*0.5,
// y=ta*0*0.866+tb*1*0.866
// 0.866=sqrt(3)/2
    pshort  rvct0 = 0x2101;  // sector 0: 2, 1, 0, 1
    pshort  rvct1 = 0xf111;  // sector 1: -1, 1, 1, 1
    pshort  rvct2 = 0xfe10;  // sector 2: -1, -2, 1, 0
    pshort  rvct3 = 0xfef0;  // sector 3: -1, -2, -1, 0
    pshort  rvct4 = 0xf1ff;  // sector 4: -1, 1, -1, -1
    pshort  rvct5 = 0x210f;  // sector 5: 2, 1, 0, -1
```

Figure 4:
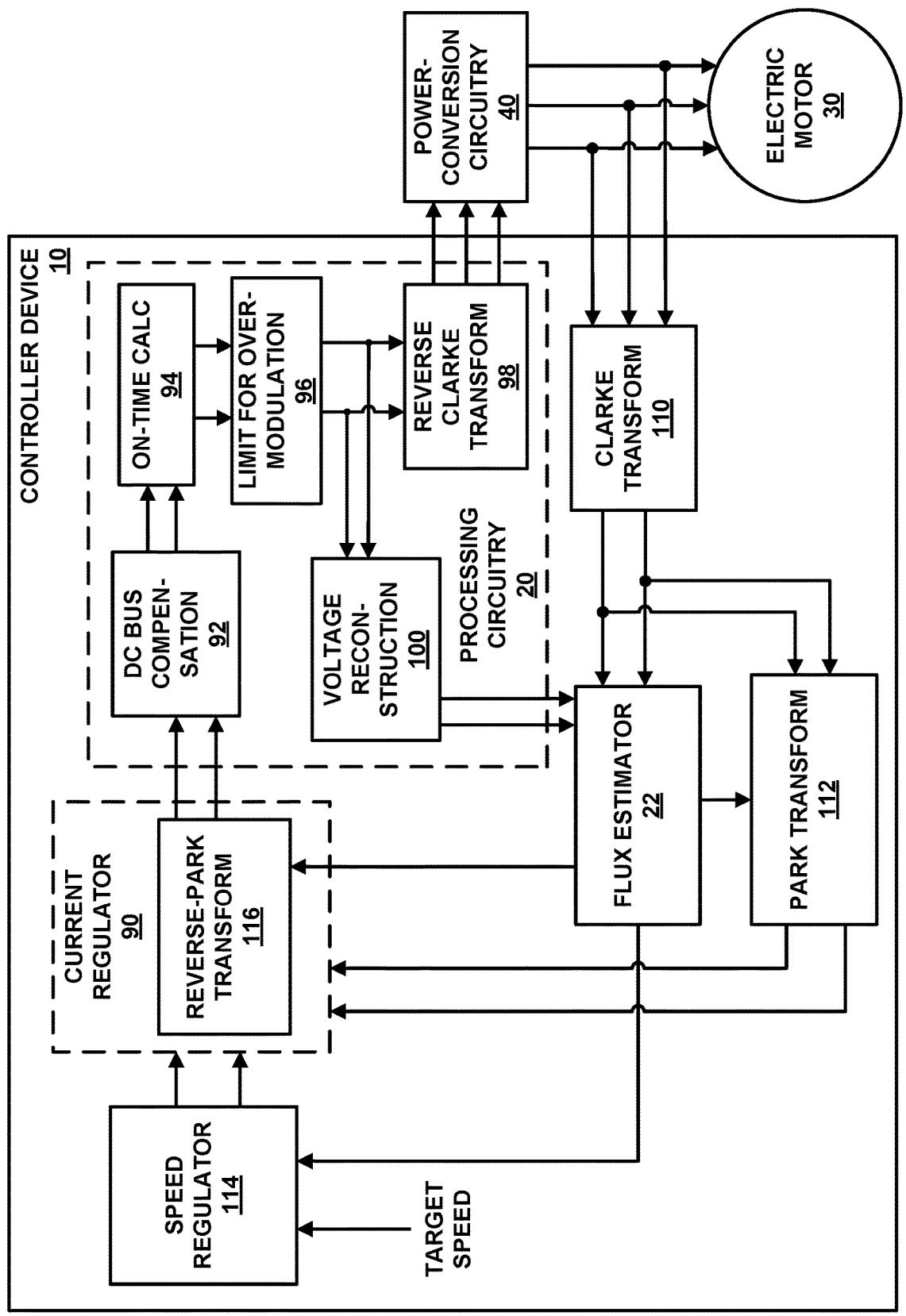
FIG. 4 is a conceptual block diagram including additional examples and details for the controller device of FIGS. 1 and 3, in accordance with some examples of this disclosure.

FIG. 4 is a conceptual block diagram including additional examples and details for controller device 10 of FIGS. 1 and 3, in accordance with some examples of this disclosure. Flux estimator 22 may determine an estimated rotor speed and an estimated rotor angle based on the reconstructed alpha voltage and the reconstructed beta voltage received from voltage reconstruction 100. The estimated rotor speed and rotor angle may be further based on the alpha current and beta current received from Clarke transform 112.

Clarke transform 110 may be configured to generate an estimated alpha current and an estimated beta current based on the electrical currents through the field windings of electric motor 30. Clarke transform 110 may convert the electrical currents through the field windings from a three-dimensional coordinate system (for three-phase motors) to a two-dimensional coordinate system. Clarke transform 110 may be configured to determine an alpha current and a beta current based on the measured phase currents in electric motor 30.

Park transform 112 may be configured to generate an estimated torque current and an estimated direct current based on the estimated alpha current, the estimated beta current, and the estimate rotor angle from flux estimator 22. Park transform 112 may convert the electrical currents from a stationary alpha-beta coordinate system to a non-stationary torque-direct coordinate system.

Speed regulator 114 may be configured to generate a target torque signal and a target direct signal based on the target speed and estimated speed for rotor 32. The target torque signal may include a quadrature-axis component that is perpendicular to a field flux linkage component of the electrical currents through the field windings of electric motor 30. For purposes of this disclosure, the "torque axis" may refer to the quadrature axis, which is offset by ninety degrees from the direct axis.

Reverse-Park transform 116 may be configured to generate the unmodulated alpha voltage and the unmodulated beta voltage based on a torque voltage, a direct voltage, and an estimated rotor angle. Reverse-Park transform 116 may convert the voltages from the non-stationary torque-direct coordinate system to the stationary alpha-beta coordinate system.

Figure 5:
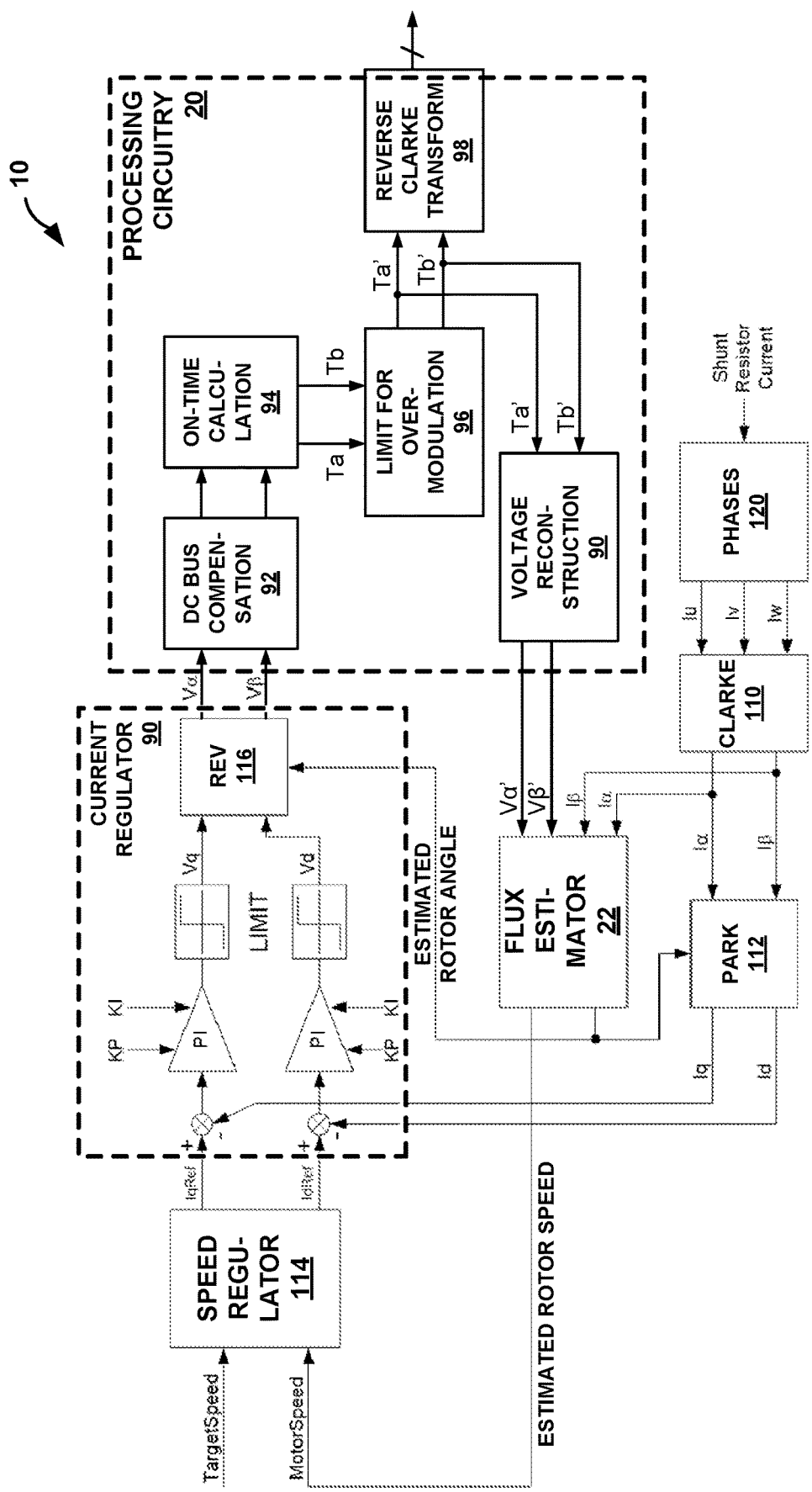
FIG. 5 is a conceptual block diagram including additional examples and details for the controller device of FIGS. 1, 3 and 4, in accordance with some examples of this disclosure.

FIG. 5 is a conceptual block diagram including additional examples and details for controller device 10 of FIGS. 1, 3 and 4, in accordance with some examples of this disclosure. Controller device 10 may include phase reconstruction 120 configured to determine the electrical currents through the field windings of electric motor 30 based on an electrical current through a shunt resistor. If electric motor 30 includes three phases, phase reconstruction 120 may determine three electrical currents.

Figure 6:
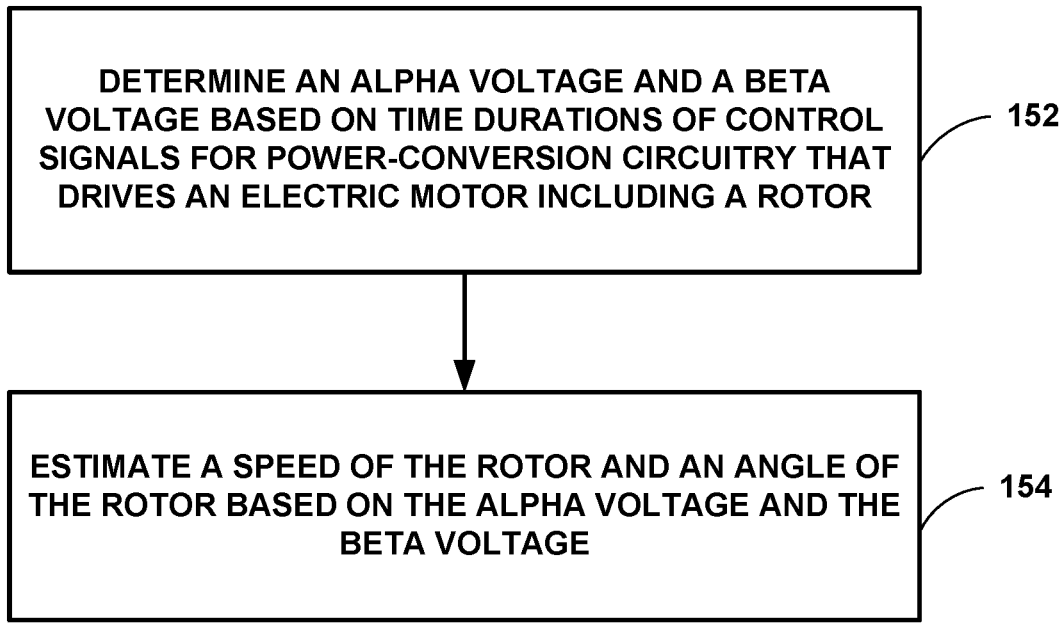
FIG. 6 is a flowchart illustrating an example technique for estimating a rotor speed and a rotor angle based on an alpha voltage and a beta voltage, in accordance with some examples of this disclosure.

FIG. 6 is a flowchart illustrating an example technique for estimating a rotor speed and a rotor angle based on an alpha voltage and a beta voltage, in accordance with some examples of this disclosure. The technique of FIG. 6 is described with reference to controller device 10 in FIGS. 1 and 3-5, although other components may exemplify similar techniques.

The technique of FIG. 6 includes determining an alpha voltage and a beta voltage based on time durations of control signals for power-conversion circuitry 40 that drives electric motor 30 including rotor 32 (152). Voltage reconstruction 100 of processing circuitry 20 may be configured to determine the alpha voltage and the beta voltage by reconstructing the voltage commands from the modulated time durations received from limit for over-modulation 96. The reconstructed alpha and beta voltages may be more accurate indications of the actual voltages across the field windings of electric motor 30, as compared to the unmodulated alpha and beta voltages determined by current regulator 90. The unmodulated alpha and beta voltages may not be adjusted (i.e., compensated and/or modulated) for the DC bus voltage and/or the maximum duty cycles of the control signals.

The technique of FIG. 6 also includes estimating a speed of rotor 32 and an angle of rotor 32 based on the alpha voltage and the beta voltage (154). Flux estimator 22 may be configured to determine an estimated rotor speed and an estimated rotor angle based on the reconstructed alpha and beta voltages and the alpha and beta currents received from Clarke transform 110. A determination of an estimated rotor speed and an estimated rotor angle based on the reconstructed alpha and beta voltages may be more accurate than a determination based on the unmodulated alpha and beta voltages determined by current regulator 90. Flux estimator 22 may determine the rotor flux based on the alpha voltage and the beta voltage, determine the estimated rotor angle based on the rotor flux, and determine the estimated rotor speed based on a rate of change of the estimated rotor angle. In some examples, flux estimator 22 may include a PLL configured to determine the estimated rotor angle based on the rotor flux.

Figure 7:
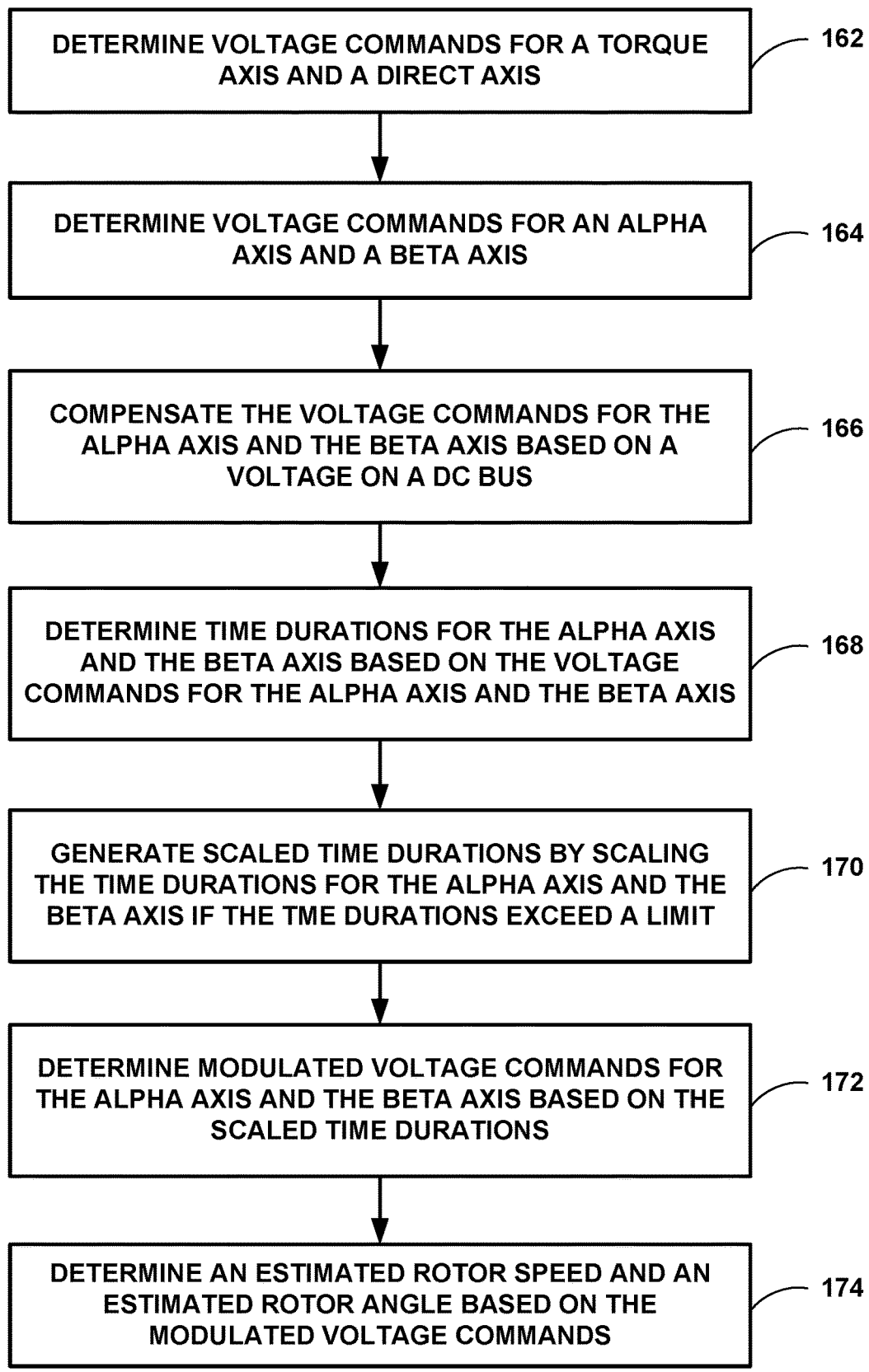
FIG. 7 is a flowchart illustrating an example technique for estimating a rotor speed and a rotor angle, in accordance with some examples of this disclosure.

FIG. 7 is a flowchart illustrating an example technique for estimating a rotor speed and a rotor angle, in accordance with some examples of this disclosure. The technique of FIG. 7 is described with reference to controller device 10 in FIGS. 1 and 3-5, although other components may exemplify similar techniques.

The technique of FIG. 7 includes determining voltage commands for a torque axis and a direct axis (162). Current regulator 90 may be configured to determine the torque voltage command and the direct voltage command. The voltages determined by current regulator 90 and/or by processing circuitry 20 may be referred as voltage commands because the voltages may be the voltages to be applied to the field windings of electric motor 30. In some examples, the direct voltage may be minimized to reduce the power consumption of power-conversion circuitry 40 and electric motor 30. The torque axis and the direct axis may be a non-stationary coordinate system that may align with the estimated rotor angle determined by flux estimator 22.

The technique of FIG. 7 further includes determining voltage commands for an alpha axis and a beta axis (164). Reverse-Park transform 116 of current regulator 90 may be configured to determine the alpha voltage command and the beta voltage command. The determination of the alpha and beta voltage commands may be based on the estimated rotor angle determined by flux estimator 22 because the torque and direct axes are non-stationary with respect to the alpha and beta axes.

The technique of FIG. 7 also includes compensating the voltage commands for the alpha axis and a beta axis based on a voltage on a DC bus (166). If the voltage on the DC bus is relatively low, DC bus compensation 92 of processing circuitry 20 may increase the alpha and beta voltage commands to compensate for the DC bus voltage. The amount of compensation may depend on the voltage of the DC bus.

The technique of FIG. 7 also includes determining time durations for the alpha axis and the beta axis based on the voltage commands for the alpha axis and the beta axis (168). On-time calculation 94 may include an algorithm or a set of rules to apply to the compensated voltage commands to determine the on times for the switches of power-conversion circuitry 40. The time durations may be proportional to the voltages that are applied to the field windings of electric motor 30.

The technique of FIG. 7 also includes generating scaled time durations by scaling the time durations for the alpha axis and the beta axis if the time durations exceed a limit (170). Limit for over-modulation 96 of processing circuitry 20 may first determine if the time durations exceed a limit, such as threshold 76 in graph 70 of FIG. 2A. A combined vector composed of the scaled time durations may include the same direction in the alpha-beta coordinate system as a combined vector of the unscaled time durations in the alpha-beta coordinate system. The vector composed of the scaled time durations may include a magnitude that is equal to or less than threshold 76.

To modulate the time durations, limit for over-modulation 96 may determine the magnitude of combined vector 79 of the unmodulated time durations. In some examples, the magnitude of combined vector 79 may be equal to the square root of the sum of the squares of unscaled time durations 72A and 72B (i.e., the Pythagorean theorem). Limit for over-modulation 96 may then determine whether the magnitude of combined vector 79 exceeds threshold 76. Limit for over-modulation 96 may determine the scaled time durations by multiplying time durations 72A and 72B by a factor based on determining that combined vector 79 exceeds threshold 76. The factor may be less than or equal to threshold 76 divided by the magnitude of combined vector 79.

The technique of FIG. 7 also includes determining modulated voltage commands for the alpha axis and the beta axis based on the scaled time durations (172). Voltage reconstruction 100 of processing circuitry 20 may determine the modulated voltage commands (i.e., scaled, compensated, and/or reconstructed voltage commands) based on scaled time durations 74A and 74B. The modulated voltage commands may represent the voltages that will be applied to the field windings by power-conversion circuitry 40 based on the scaled time durations. Processing circuitry 20 executing instructions such as the pseudocode included herein may determine modulated voltage commands for the alpha axis and the beta axis based on scaled time durations 74A and 74B.

The technique of FIG. 7 also includes determining an estimated rotor speed and an estimated rotor angle based on the modulated voltage commands (174). Flux estimator 22 may estimate the rotor speed and the rotor angle based on the modulated voltage commands and the alpha and beta currents received from Clarke transform 110. Flux estimator 22 may determine the rotor flux based on the alpha voltage and the beta voltage, determine the estimated rotor angle based on the rotor flux, and determine the estimated rotor speed based on a rate of change of the estimated rotor angle. In some examples, flux estimator 22 may include a PLL configured to determine the estimated rotor angle based on the rotor flux.

The technique of FIG. 7 may allow controller device 10 to determine an estimated rotor speed and an estimated rotor angle more accurately than another controller device that estimates rotor speed and rotor angle based on unmodulated voltage commands. The more accurate estimates of rotor speed and rotor angle may allow controller device 10 and electric motor 30 to operate at a lower ratio of PWM frequency to motor RPM, as compared to other controller devices. For example, another controller device may operate at a PWM frequency of twenty-two thousand kilohertz and a rotor speed of twenty-five thousand RPM, for a ratio of approximately fifty-three to one. Controller device 10 may operate at a PWM frequency of fifteen thousand kilohertz and a rotor speed of twenty-five thousand RPM, for a ratio of approximately thirty-six to one.

Controller device 10 may be used in a variety applications, including applications that benefit from a smaller ratio of PWM frequency to motor speed. For example, a motor for a fan or an air-conditioner compressor may run at a relatively low motor speed, allowing the PWM frequency to be decreased to reduce the switching losses in the power-conversion circuitry. A motor for unmanned aerial vehicle may run at a relatively high motor speed, such that a designer may choose a controller device implementing the techniques of this disclosure, where the controller device operates at a lower PWM frequency than another controller device. Both controller devices may be designed to control motors at the same rotor speed, but controller device 10 may include less expensive hardware and may cause the power-conversion circuitry to experience lower switching losses, as compared to the other controller device.

Figure 8:
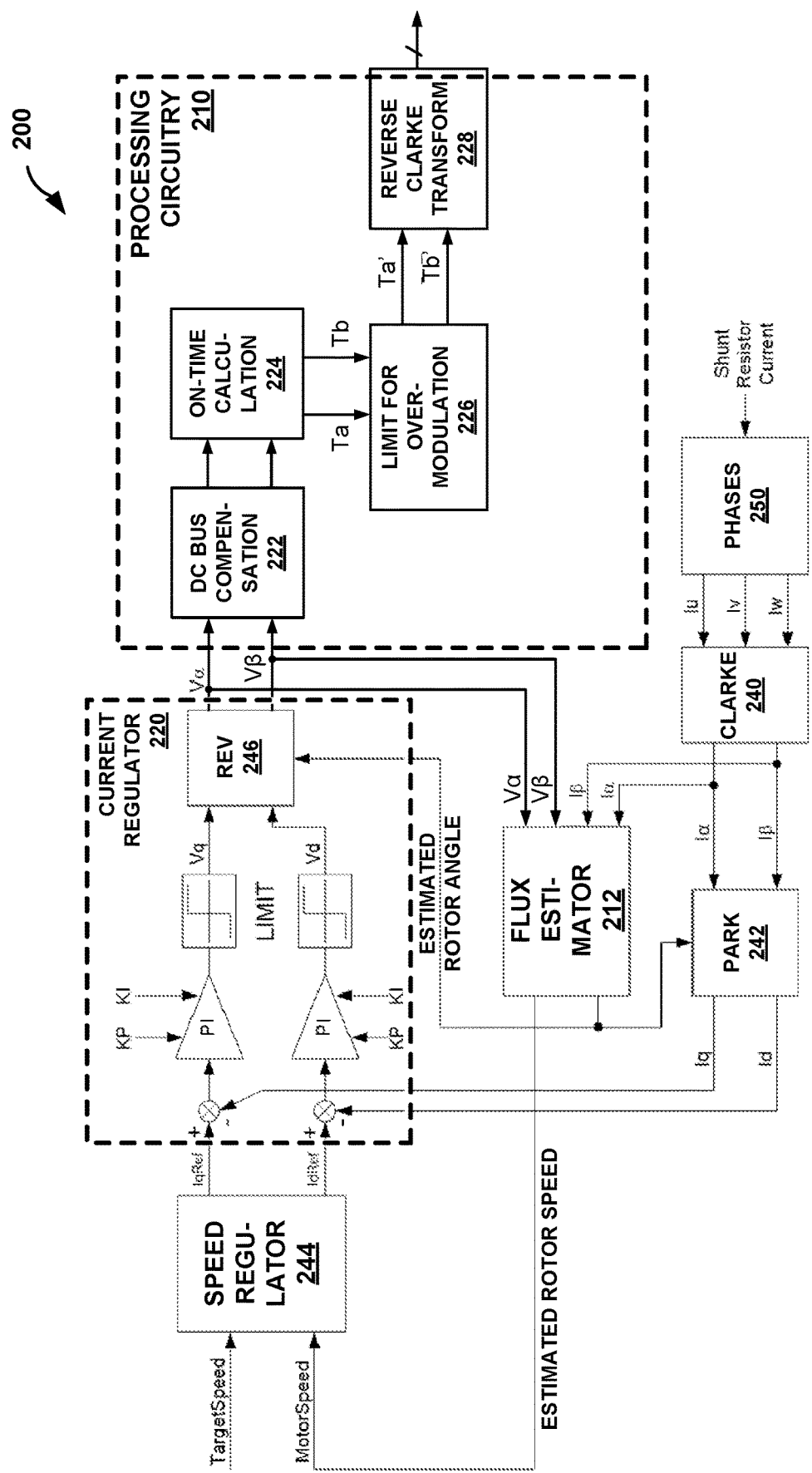
FIG. 8 is a conceptual block diagram illustrating details for another controller device.

FIG. 8 is a conceptual block diagram illustrating details for another controller device 200. Controller device 200 includes flux estimator 212, which is configured to estimate the rotor speed and rotor angle based on an unmodulated alpha voltage (Vα) and an unmodulated beta voltage (Vβ). Flux estimator 212 may determine a less accurate estimated rotor speed and a less accurate estimated rotor angle, as compared to flux estimator 22 in FIGS. 1 and 3-5. The estimates of rotor speed and rotor angle by flux estimator 212 may be less accurate because the unmodulated voltage commands (Vα and Vβ) may not be as accurate as the reconstructed voltage commands (Vα' and Vβ') generated by voltage reconstruction 100.

The techniques of this disclosure may be implemented in a device or article of manufacture comprising a computer-readable storage medium. The term "processing circuitry," as used herein may refer to any of the foregoing structure or any other structure suitable for processing program code and/or data or otherwise implementing the techniques described herein. Elements of controller device 10 and/or processing circuitry 20 may be implemented in any of a variety of types of solid state circuit elements, such as CPUs, CPU cores, GPUs, digital signal processors (DSPs), application-specific integrated circuits (ASICs), a mixed-signal integrated circuits, field programmable gate arrays (FPGAs), microcontrollers, programmable logic controllers (PLCs), programmable logic device (PLDs), complex PLDs (CPLDs), a system on a chip (SoC), any subsection of any of the above, an interconnected or distributed combination of any of the above, or any other integrated or discrete logic circuitry, or any other type of component or one or more components capable of being configured in accordance with any of the examples disclosed herein. Processing circuitry may also include analog components arranged in a mixed-signal IC.

Controller device 10 and/or processing circuitry 20 may include memory. One or more memory devices of the memory may include any volatile or non-volatile media, such as a RAM, ROM, non-volatile RAM (NVRAM), electrically erasable programmable ROM (EEPROM), flash memory, and the like. One or more memory devices of the memory may store computer readable instructions that, when executed by the processing circuitry, cause the processing circuitry to implement the techniques attributed herein to the processing circuitry.

Elements of controller device 10 and/or processing circuitry 20 may be programmed with various forms of software. The processing circuitry may be implemented at least in part as, or include, one or more executable applications, application modules, libraries, classes, methods, objects, routines, subroutines, firmware, and/or embedded code, for example. The processing circuitry may be configured to receive voltage signals, determine switching frequencies, and deliver control signals.

The techniques of this disclosure may be implemented in a wide variety of computing devices. Any components, modules or units have been described to emphasize functional aspects and does not necessarily require realization by different hardware units. The techniques described herein may be implemented in hardware, software, firmware, or any combination thereof. Any features described as modules, units or components may be implemented together in an integrated logic device or separately as discrete but interoperable logic devices. In some cases, various features may be implemented as an integrated circuit device, such as an integrated circuit chip or chipset.

The following numbered examples demonstrate one or more aspects of the disclosure.

Example 1

A controller device includes processing circuitry configured to determine an alpha voltage and a beta voltage based on time durations for control signals for power-conversion circuitry that drives an electric motor including a rotor. The controller device also includes a flux estimator configured to estimate a speed of the rotor and an angle of the rotor based on the alpha voltage and the beta voltage.

Example 2

The controller device of example 1, wherein the alpha voltage is a modulated alpha voltage, wherein the beta voltage is a modulated beta voltage, wherein the time durations for the control signals are modulated time durations. The processing circuitry is further configured to determine unmodulated time durations for the control signals based on an unmodulated alpha voltage and an unmodulated beta voltage. The processing circuitry is further configured to determine the modulated time durations based on the unmodulated time durations for the control signals.

Example 3

The controller device of examples 1 or 2 or any combination thereof, wherein the processing circuitry is further configured to determine the unmodulated alpha voltage and the unmodulated beta voltage based on a direct voltage and a torque voltage, wherein the modulated alpha voltage is a component of a combined voltage vector along a stationary alpha axis, wherein the modulated beta voltage is a component of the combined voltage vector along a stationary beta axis, wherein the direct voltage is a component of the combined voltage vector along a non-stationary direct axis, and wherein the torque voltage is a component of the combined voltage vector along a non-stationary torque axis.

Example 4

The controller device of examples 1-3 or any combination thereof, wherein the processing circuitry is further configured to determine the direct voltage and the torque voltage based on a previous estimate of the angle of the rotor.

Example 5

The controller device of examples 1-4 or any combination thereof, further including a direct-current (DC) bus. The processing circuitry is configured to determine the unmodulated time durations based on the unmodulated alpha voltage and the unmodulated beta voltage by at least determining a compensated alpha voltage and a compensated beta voltage based on the unmodulated alpha voltage, the unmodulated beta voltage, and a voltage on a DC bus, and determining the unmodulated time durations based on the compensated alpha voltage and the compensated beta voltage.

Example 6

The controller device of examples 1-5 or any combination thereof, wherein the processing circuitry is configured to determine the modulated time durations based on the unmodulated time durations by at least scaling the unmodulated time durations if the unmodulated time durations exceed a threshold.

Example 7

The controller device of examples 1-6 or any combination thereof, wherein the processing circuitry is configured to scale the unmodulated time durations if the unmodulated time durations exceed the threshold by at least determining a magnitude of a combined vector of the unmodulated time durations, determining whether the magnitude of the combined vector exceeds the threshold, and determining the modulated time durations for the control signals by multiplying each unmodulated time duration of the unmodulated time durations by a factor based on determining that the combined vector exceeds the threshold, wherein the factor is less than or equal to the threshold divided by the magnitude of the combined vector.

Example 8

The controller device of examples 1-7 or any combination thereof, wherein the time durations of the control signals include two-dimensional time durations of the control signals, and the electric motor includes a three-phase electric motor. The processing circuitry is further configured to determine three-dimensional time durations of the control signals based on the two-dimensional time durations of the control signals, and generate the control signals based on determining the three-dimensional time durations.

Example 9

The controller device of examples 1-8 or any combination thereof, wherein the alpha voltage and the beta voltage are coordinates in a two-dimensional Cartesian system including an alpha axis and a beta axis that are centered on the rotor, wherein the alpha axis and the beta axis are non-stationary axes.

Example 10

A method includes determining an alpha voltage and a beta voltage based on time durations of control signals for power-conversion circuitry that drives an electric motor including a rotor. The method also includes estimating a speed of the rotor and an angle of the rotor based on the alpha voltage and the beta voltage.

Example 11

The method of example 10, wherein the alpha voltage is a modulated alpha voltage, wherein the beta voltage is a modulated beta voltage, wherein the time durations for the control signals are modulated time durations. The method further includes determining unmodulated time durations for the control signals based on an unmodulated alpha voltage and an unmodulated beta voltage. The method further includes determining the modulated time durations based on the unmodulated time durations for the control signals.

Example 12

The method of examples 10 or 11 or any combination thereof, further including determining the unmodulated alpha voltage and the unmodulated beta voltage based on a direct voltage and a torque voltage, wherein the alpha voltage is a component of a combined voltage vector along a stationary alpha axis, wherein the beta voltage is a component of the combined voltage vector along a beta stationary axis, wherein the direct voltage is a component of the combined voltage vector along a non-stationary direct axis, and wherein the torque voltage is a component of the combined voltage vector along a non-stationary torque axis.

Example 13

The method of examples 10-12 or any combination thereof, further including determining the direct voltage and the torque voltage based on a previous estimate of the angle of the rotor.

Example 14

The method of examples 10-13 or any combination thereof, wherein determining the unmodulated time durations includes determining a compensated alpha voltage and a compensated beta voltage based on the unmodulated alpha voltage, the unmodulated beta voltage, and a voltage on a direct-current (DC) bus. Determining the unmodulated time durations further includes determining the unmodulated time durations based on the compensated alpha voltage and the compensated beta voltage.

Example 15

The method of examples 10-13 or any combination thereof, wherein determining the unmodulated time durations includes determining a magnitude of a combined vector of the unmodulated time durations, and determining whether the magnitude of the combined vector exceeds the threshold. Determining the unmodulated time durations further includes determining the modulated time durations for the control signals by multiplying each unmodulated time duration of the unmodulated time durations by a factor based on determining that the combined vector exceeds the threshold, wherein the factor is less than or equal to the threshold divided by the magnitude of the combined vector.

Example 16

The method of examples 10-13 or any combination thereof, wherein the time durations of the control signals include two-dimensional time durations of the control signals, and wherein the electric motor includes a three-phase electric motor. The method further includes determining three-dimensional time durations of the control signals based on the two-dimensional time durations of the control signals, and generating the control signals based on determining the three-dimensional time durations.

Example 17

A system includes an electric motor including a rotor and field windings, power-conversion circuitry configured to drive the electric motor, and a controller device configured to generate control signals for the power-conversion circuit. The controller device includes processing circuitry configured to determine an alpha voltage and a beta voltage based on time durations for the control signals. The controller device also includes a flux estimator configured to estimating a speed of the rotor and an angle of the rotor based on the alpha voltage and the beta voltage.

Example 18

The system of example 17, wherein the alpha voltage is a modulated alpha voltage, wherein the beta voltage is a modulated beta voltage, wherein the time durations for the control signals are modulated time durations. The processing circuitry is further configured to determine unmodulated time durations for the control signals based on an unmodulated alpha voltage and an unmodulated beta voltage. The processing circuitry is further configured to determine the modulated time durations based on the unmodulated time durations for the control signals.

Example 19

The system of examples 17-18 or any combination thereof, wherein the processing circuitry is further configured to determine the direct voltage and the torque voltage based on a previous estimate of the angle of the rotor, and determine the unmodulated alpha voltage and the unmodulated beta voltage based on a direct voltage and a torque voltage. The modulated alpha voltage is a component of a combined voltage vector along a stationary alpha axis. The modulated beta voltage is a component of the combined voltage vector along a stationary beta axis. The direct voltage is a component of the combined voltage vector along a non-stationary direct axis. The torque voltage is a component of the combined voltage vector along a non-stationary torque axis.

Example 20

The system of examples 17-19 or any combination thereof, wherein the processing circuitry is configured to determine the modulated time durations based on the unmodulated time durations by at least determining a magnitude of a combined vector of the unmodulated time durations, and determining whether the magnitude of the combined vector exceeds a threshold. The processing circuitry is further configured to determine the modulated time durations by at least determining the modulated time durations for the control signals by multiplying each unmodulated time duration of the unmodulated time durations by a factor based on determining that the combined vector exceeds the threshold, wherein the factor is less than or equal to the threshold divided by the magnitude of the combined vector.

Various examples of the disclosure have been described. Any combination of the described systems, operations, or functions is contemplated. These and other examples are within the scope of the following claims.

What is claimed is:

1. A controller device comprising:
   processing circuitry configured to:
   determine a compensated alpha voltage and a compensated beta voltage based on an unmodulated alpha voltage, an unmodulated beta voltage, and a voltage on a direct-current bus;
   determine time durations for control signals for power-conversion circuitry that drives an electric motor including a rotor based on the compensated alpha voltage and the compensated beta voltage;
   determine a modulated alpha voltage and a modulated beta voltage based on the time durations for the control signals; and
   a flux estimator configured to estimate a speed of the rotor and an angle of the rotor based on the modulated alpha voltage and the modulated beta voltage.

2. The controller device of claim 1, wherein the time durations for the control signals are modulated time durations, and wherein the processing circuitry is configured to determine the time durations for the control signals by:
   determining unmodulated time durations for the control signals based on the compensated alpha voltage and the compensated beta voltage; and
   determining the modulated time durations based on the unmodulated time durations for the control signals.

3. The controller device of claim 2,
   wherein the processing circuitry is further configured to determine the unmodulated alpha voltage and the unmodulated beta voltage based on a direct voltage and a torque voltage,
   wherein the modulated alpha voltage is a component of a combined voltage vector along a stationary alpha axis,
   wherein the modulated beta voltage is a component of the combined voltage vector along a stationary beta axis,
   wherein the direct voltage is a component of the combined voltage vector along a non-stationary direct axis, and
   wherein the torque voltage is a component of the combined voltage vector along a non-stationary torque axis.

4. The controller device of claim 3, wherein the processing circuitry is further configured to determine the direct voltage and the torque voltage based on a previous estimate of the angle of the rotor.

5. The controller device of claim 2, wherein the processing circuitry is configured to determine the modulated time durations based on the unmodulated time durations by at least scaling the unmodulated time durations if the unmodulated time durations exceed a threshold.

6. The controller device of claim 5, wherein the processing circuitry is configured to scale the unmodulated time durations if the unmodulated time durations exceed the threshold by at least:
   determining a magnitude of a combined vector of the unmodulated time durations; and
   determining whether the magnitude of the combined vector exceeds the threshold,
   wherein the processing circuitry is configured to determine the modulated time durations for the control signals by multiplying each unmodulated time duration of the unmodulated time durations by a factor based on determining that the combined vector exceeds the threshold,
   wherein the factor is less than or equal to the threshold divided by the magnitude of the combined vector.

7. The controller device of claim 1, wherein:
   the time durations for the control signals comprise two-dimensional time durations for the control signals;
   the electric motor comprises a three-phase electric motor; and
   the processing circuitry is further configured to:
   determine three-dimensional time durations for the control signals based on the two-dimensional time durations for the control signals; and
   generate the control signals based on determining the three-dimensional time durations.

8. The controller device of claim 1, wherein the modulated alpha voltage and the modulated beta voltage are coordinates in a two-dimensional Cartesian system including an alpha axis and a beta axis that are centered on the rotor, wherein the alpha axis and the beta axis are stationary axes.

9. A method running on a controller, the method comprising:
    determining a compensated alpha voltage and a compensated beta voltage based on an unmodulated alpha voltage, an unmodulated beta voltage, and a voltage on a direct-current bus;
    determining time durations for control signals for power-conversion circuitry that drives an electric motor including a rotor based on the compensated alpha voltage and the compensated beta voltage;
    determining a modulated alpha voltage and a modulated beta voltage based on time durations for the control signals; and
    estimating a speed of the rotor and an angle of the rotor based on the modulated alpha voltage and the modulated beta voltage.

10. The method of claim 9, wherein the time durations for the control signals are modulated time durations, and wherein determining the time durations for the control signals comprises:
    determining unmodulated time durations for the control signals based on the compensated alpha voltage and the compensated beta voltage; and
    determining the modulated time durations based on the unmodulated time durations for the control signals.

11. The method of claim 10, further comprising determining the unmodulated alpha voltage and the unmodulated beta voltage based on a direct voltage and a torque voltage, wherein the alpha voltage is a component of a combined voltage vector along a stationary alpha axis, wherein the beta voltage is a component of the combined voltage vector along a beta stationary axis, wherein the direct voltage is a component of the combined voltage vector along a non-stationary direct axis, and wherein the torque voltage is a component of the combined voltage vector along a non-stationary torque axis.

12. The method of claim 11, further comprising determining the direct voltage and the torque voltage based on a previous estimate of the angle of the rotor.

13. The method of claim 10, wherein determining the modulated time durations comprises:
    determining a magnitude of a combined vector of the unmodulated time durations;
    determining whether the magnitude of the combined vector exceeds the threshold;
    determining the modulated time durations for the control signals by multiplying each unmodulated time duration of the unmodulated time durations by a factor based on determining that the combined vector exceeds the threshold, wherein the factor is less than or equal to the threshold divided by the magnitude of the combined vector.

14. The method of claim 9, wherein the time durations for the control signals comprise two-dimensional time durations for the control signals, and wherein the electric motor comprises a three-phase electric motor, the method further comprising:
    determining three-dimensional time durations for the control signals based on the two-dimensional time durations for the control signals; and
    generating the control signals based on determining the three-dimensional time durations.

15. A system comprising:
    an electric motor including a rotor and field windings;
    power-conversion circuitry configured to drive the electric motor; and
    a controller device configured to generate control signals for the power-conversion circuit, the controller device including:
        processing circuitry configured to:
            determine a compensated alpha voltage and a compensated beta voltage based on an unmodulated alpha voltage, an unmodulated beta voltage, and a voltage on a direct-current bus;
            determine time durations for control signals for power-conversion circuitry that drives an electric motor including a rotor based on the compensated alpha voltage and the compensated beta voltage;
            determine a modulated alpha voltage and a modulated beta voltage based on the time durations for the control signals; and
        a flux estimator configured to estimating a speed of the rotor and an angle of the rotor based on the modulated alpha voltage and the modulated beta voltage.

16. The system of claim 15, wherein the time durations for the control signals are modulated time durations, and wherein the processing circuitry is configured to determine the time durations for the control signals by:
    determining unmodulated time durations for the control signals based on the compensated alpha voltage and the compensated beta voltage; and
    determining the modulated time durations based on the unmodulated time durations for the control signals.

17. The system of claim 16, wherein the processing circuitry is further configured to:
    determine the direct voltage and the torque voltage based on a previous estimate of the angle of the rotor; and
    determine the unmodulated alpha voltage and the unmodulated beta voltage based on a direct voltage and a torque voltage,
    wherein the modulated alpha voltage is a component of a combined voltage vector along a stationary alpha axis,
    wherein the modulated beta voltage is a component of the combined voltage vector along a stationary beta axis,
    wherein the direct voltage is a component of the combined voltage vector along a non-stationary direct axis, and
    wherein the torque voltage is a component of the combined voltage vector along a non-stationary torque axis.

18. The system of claim 16, wherein the processing circuitry is configured to determine the modulated time durations based on the unmodulated time durations by at least:
    determining a magnitude of a combined vector of the unmodulated time durations;
    determining whether the magnitude of the combined vector exceeds a threshold;
    determining the modulated time durations for the control signals by multiplying each unmodulated time duration of the unmodulated time durations by a factor based on determining that the combined vector exceeds the threshold, wherein the factor is less than or equal to the threshold divided by the magnitude of the combined vector.

19. A controller device comprising:
    processing circuitry configured to:
        determine unmodulated time durations for control signals for power-conversion circuitry that drives an electric motor including a rotor based on an unmodulated alpha voltage and an unmodulated beta voltage;

determine whether the unmodulated time durations exceed a threshold;

determine modulated time durations based on the unmodulated time durations by at least scaling the unmodulated time durations in response to determining that the unmodulated time durations exceed the threshold;

determine a modulated alpha voltage and a modulated beta voltage based on ti me durations for control signals for power-conversion circuitry that drives an electric motor including a rotor; and a flux estimator configured to estimate a speed of the rotor and an angle of the rotor based on the modulated alpha voltage and the modulated beta voltage.

20. The controller device of claim 19, wherein the processing circuitry is configured to determine whether the unmodulated time durations exceed the threshold by at least:

determining a magnitude of a combined vector of the unmodulated time durations; and determining whether the magnitude of the combined vector exceeds the threshold, wherein determining the modulated time durations for the control signals comprises multiplying each unmodulated time duration of the unmodulated time durations by a factor based on determining that the combined vector exceeds the threshold, wherein the factor is less than or equal to the threshold divided by the magnitude of the combined vector.

* * * * *